United States Patent [19]

Shimura et al.

[11] Patent Number: 5,246,521
[45] Date of Patent: Sep. 21, 1993

[54] FILM CONTAINER, TEREMP AND METHOD OF BONDING TEREMP TO SHELL PLATE OF FILM CARTRIDGE

[75] Inventors: Hiromi Shimura; Shigemitsu Mizutani; Kazuyoshi Suehara; Kazunori Mizuno; Koichi Takahashi, all of Kanagawa, Japan

[73] Assignee: Fuji Photo Film Co., Ltd., Minamiashigara, Japan

[21] Appl. No.: 729,229

[22] Filed: Jul. 12, 1991

[30] Foreign Application Priority Data

Jul. 12, 1990 [JP] Japan .............................. 2-74029[U]
Jul. 13, 1990 [JP] Japan .............................. 2-185859

[51] Int. Cl.5 ............................................. B32B 3/00
[52] U.S. Cl. ..................................... 156/251; 156/544; 156/556; 206/389; 206/408; 206/416; 354/178; 354/274; 354/275; 354/277; 354/319; 354/322
[58] Field of Search .................... 156/251, 544, 556; 354/319, 322, 274, 178, 275, 277; 206/408, 416, 389

[56] References Cited

U.S. PATENT DOCUMENTS

| 4,212,389 | 7/1980 | Robbins . | |
| 4,429,976 | 2/1984 | Sekine et al. | 354/203 |
| 4,505,387 | 3/1985 | Seto | 242/71.1 |
| 4,568,590 | 2/1986 | Iwai | 354/277 |
| 4,730,778 | 3/1988 | Akao et al. | 242/71.1 |
| 4,787,506 | 11/1988 | Akao | 242/71.1 |
| 4,832,197 | 5/1989 | Hara | 242/71.1 |
| 4,862,579 | 9/1989 | Takahashi et al. . | |
| 4,867,815 | 9/1989 | Hoffacker et al. . | |
| 4,891,089 | 1/1990 | Takashashi et al. | 156/522 |

FOREIGN PATENT DOCUMENTS

| 440240 | 8/1991 | European Pat. Off. . |
| 452900 | 10/1991 | European Pat. Off. . |
| 203575 | 10/1983 | Fed. Rep. of Germany . |
| 3346495 | 6/1984 | Fed. Rep. of Germany . |
| 48-35790 | 10/1973 | Japan . |
| 1063226 | 3/1967 | United Kingdom . |

Primary Examiner—David A. Simmons
Assistant Examiner—Merrick Dixon
Attorney, Agent, or Firm—Burns, Doane, Swecker & Mathis

[57] ABSTRACT

A pair of teremps of a knitted structure are bonded to a blank of a shell plate of a film cartridge. A pair of teremps in continuous lengths is conveyed in the longitudinal direction thereof with the piled side of each of the teremps kept in contact with a locator member. The teremps in continuous lengths are bonded to opposite side edges of the blank and then cut to conform to the blank. Before they are brought into contact with the locator members, the teremps in continuous lengths are subjected to a process in which the pile is substantially uniformly oriented rearward at an angle with respect to the direction in which the teremps are conveyed.

1 Claim, 6 Drawing Sheets

FILM CONTAINER, TEREMP AND METHOD OF BONDING TEREMP TO SHELL PLATE OF FILM CARTRIDGE

BACKGROUND OF THE INVENTION

1. Field of the Invention

This invention relates to a film cartridge having a teremp along a film exit slit thereof and to a method of bonding the teremp to a shell plate of the film cartridge. This invention also relates to the teremp.

2. Description of the Prior Art

A photographic 35 mm roll film is accommodated in a film cartridge which basically comprises a tubular shell plate, a film spool, and caps on the ends of the shell plate. A light-shielding material generally called teremp is bonded on the inner surface of the shell plate along a film exit slit through which the film is drawn out. In this specification, the term "teremp" should be broadly interpreted to include both a material comprising a base fabric of a woven structure and pile provided thereon and a material comprising a base fabric of a knitted structure and pile provided thereon. As disclosed, for instance, in Japanese Unexamined Patent Publication No. 59(1984)-143841, a pair of teremps are bonded on opposite end portions of the shell plate before it is tubed.

In the method disclosed in U.S. Pat. Nos. 4,682,579 and 4,891,089, a teremp in a continuous length is conveyed in its longitudinal direction, bonded to the left and right end portions of the shell plate and then cut to conform to the shell plate. This method improves the teremp bonding efficiency as compared with a method in which the teremp is cut in advance to conform to the size of the shell plate and then bonded to the shell plate.

Recently there have come into wide use teremps of a knitted structure instead of teremps of a woven structure as disclosed in Japanese Utility Model Publication No. 61(1986)-34526. It has been found that the teremp of the knitted structure is more apt to be bonded in a wrong position than that of the woven structure. Our investigation has revealed that such a phenomenon is mainly due to the following two causes.

That is, in order to precisely bond the teremp to a predetermined portion of the shell plate (the portion which forms the film exit slit), a positioning member which contacts the teremp in continuous length while it is conveyed and positions it in the transverse direction is required. As such a positioning member, a member which contacts the teremp on its piled side is generally required for the reason of setting the teremp conveying path. An example of such a member is shown in FIG. 6 and indicated at 5a. In FIG. 6, reference numeral 21a denotes the teremp and reference numeral 21p denotes the piled side thereof.

Generally, the larger the angle α is, the more easily the teremp can be positioned, and accordingly, the angle α is formed substantially large. However when the angle α is large, a large drag acts on the piled side. The drag varies according to the orientation of the pile. In the conventional teremp of the knitting structure, the orientation of the pile is irregular and accordingly, the drag greatly fluctuates during conveyance of the teremp, whereby the teremp is displaced in a direction at an angle to the teremp conveying direction and as a result the teremp is bonded to the shell plate in a wrong position.

Further the teremp in a continuous length is formed by slitting a wide sheet in a continuous length. In the case of the teremp of the knitted structure, the teremp is slit by sealing and cutting in order to prevent fraying of the teremp and/or falling-off of the pile yarn at the cut portion.

However sealing and cutting often causes twist in the teremp in a continuous length. That is, the base fabric and the pile yarn of the teremp are generally formed thermoplastic fibers such as nylon or acetate, and thermoplastic resin such as polyvinyl resin or synthetic rubber resin is applied to the side of the base fabric opposite to the piled side as sealant or adhesive. The thermoplastic fibers and the thermoplastic resin at the cut portion expand due to heat applied thereto during sealing and cutting and solidify in that state while those in the middle portion are not subjected to heat, whereby twisting is generated in the teremp. When the teremp twists, the positioning member cannot precisely position the teremp relative to the shell plate and the teremp can be bonded in a wrong position.

Further twisting in the teremp can cause the teremp to slip off a conveyor roller.

When the teremp is bonded in a wrong position, light can enter the film cartridge to expose the film therein and/or the film therein can be damaged.

Further there has been a known a fact that a larger force is required to draw out the film in the film cartridge having the teremp of the knitted structure than in the film cartridge having the teremp of the woven structure.

There have been known various teremps. For example, in Japanese Utility Model Publication 46(1971)-20539, there is disclosed a teremp of a woven structure, and in Japanese Unexamined Patent Publication No. 54(1979)-36925, there is disclosed a teremp produced by static flocking.

However, the teremp of a woven structure is disadvantageous in that fraying is apt to occur and/or the pile is apt to fall off during manufacture thereof or when the film is drawn out or taken into the film cartridge. Further the teremp manufactured by the static flocking is disadvantageous in that the workability is bad since adhesive is used and the pile easily falls off though the manufacturing process is somewhat simplified.

Thus the assignee of the present invention has proposed a teremp which has a knitted structure as disclosed in Japanese Utility Model Publication No. 61(1986)-34526. Though the teremp of a knitted structure is advantageous over the conventional teremps in that fraying or falling-off of the pile is reduced, the light-shielding performance is sometimes unsatisfactory due to large spaces between the chain yarns.

Further since the pile yarns are knitted into the chain yarns of the base fabric, pile yarns easily fall off when the chain yarn breaks.

Further there has been proposed, as disclosed in Japanese Patent Publication No. 62(1987)-40696, a teremp having pile conductive fibers formed by dispersing linear polymer containing therein inorganic conductive material in fiber-forming polymer. However this teremp is apt to scratch the photosensitive layer of the photographic film due to its high rigidity and is expensive.

Further, there has been proposed in Japanese Unexamined Patent Publication No. 60(1985)-208751 a teremp formed of conjugated yarn. This teremp is disadvantageous in that it is expensive and at the same time, a large drag is generated when the film is drawn out the film cartridge due to large thickness of filaments.

Accordingly there has been a great demand for a teremp which can be manufactured at low cost and exhibits an excellent light-shielding performance and in which fraying or falling-off of the pile is less apt to occur.

SUMMARY OF THE INVENTION

In view of the foregoing observations and description, the primary object of the present invention is to provide a method of bonding the teremp to the shell plate of a film cartridge in which a teremp of a knitted structure can be precisely bonded to a predetermined position of the shell plate.

Another object of the present invention is to provide a film cartridge having a teremp of a knitted structure in which the film can be drawn out with a relatively small force.

Still another object of the present invention is to provide a teremp which exhibits an excellent light-shielding function and can be manufactured at low cost.

In a first aspect of the present invention, there is provided a method of bonding a pair of teremps of a knitted structure to a blank of a shell plate of a film cartridge comprising the steps of conveying a teremp in continuous lengths in the longitudinal direction thereof with the piled side of the teremp kept in contact with a locator member, bonding the teremps in continuous lengths to opposite side edges of the blank and then cutting the teremps to conform to the blank wherein the improvement comprises the step of subjecting the teremps in continuous lengths, before they are brought into contact with the locator member, to a process in which the pile is substantially uniformly oriented at an angle rearward with respect to the direction in which the teremp is conveyed.

When the pile is uniformly oriented with respect to the direction in which the teremp is conveyed, the drag of the teremp is remarkably reduced and accordingly positioning of the teremp in a wrong position relative to the shell plate due to fluctuation in the drag can be prevented.

In accordance with another aspect of the present invention, there is provided a method of bonding a pair of teremps of a knitted structure to a blank of a shell plate of a film cartridge comprising the steps of conveying a pair of teremps in continuous lengths in the longitudinal direction thereof with the piled side of each of the teremps kept in contact with a locator member, bonding the teremps in continuous lengths to opposite side edges of the blank and then cutting the teremps to conform to the blank, each of the teremps being slit by sealing and cutting from a wide sheet which is formed of thermoplastic fiber and applied with thermoplastic resin on the side opposite to the pile side, wherein the improvement comprises the step of heating the teremps to a temperature not lower than the softening point of the thermoplastic materials and lower than the melting points of the same and then cooling the teremps to a temperature lower than the softening point during conveyance of the teremps while imparting a tension to the teremps in the longitudinal direction thereof.

With this arrangement, each teremp stretches at the middle portion by a degree substantially equal to that at this edge portions along which the teremp was cut and then solidifies in the state. Accordingly after the treatment, the teremps are free from twist described above.

In accordance with still another aspect of the present invention, there is provided a film cartridge having a teremp provided at a film exit slit in which the pile of the teremp is substantially uniformly oriented rearward at an angle with respect to the direction in which the film is drawn out through the film exit slit.

This inventors have found that when the orientation of the pile is irregular, a larger force is required to draw out the film. Accordingly, when the orientation of the file is regular, the film can be drawn out by a smaller force.

When the orientation of the pile includes a component directed in a direction opposite to the direction in which the film is drawn out, even if it is minor, the pile is considered to be oriented rearward.

In accordance with still another aspect of the present invention, there is provided a teremp comprising a base fabric of a knitted structure and a piled portion knitted into the base fabric characterized in that the chain yarn which forms the base fabric has a wale density of 15 to 38 wales/inch.

In accordance with still another aspect of the present invention, there is provided a film cartridge having a teremp provided at a film exit slit characterized in that the yarns forming the teremp are all dyed by yarn-dyeing and the yarn forming the base fabric differs from that forming the pile portion.

DESCRIPTION OF THE PREFERRED EMBODIMENTS

A method of bonding the teremps to the shell plate of the film cartridge in accordance with a first embodiment of the present invention will be described with reference to FIGS. 1 to 9, hereinbelow.

Figure 2:
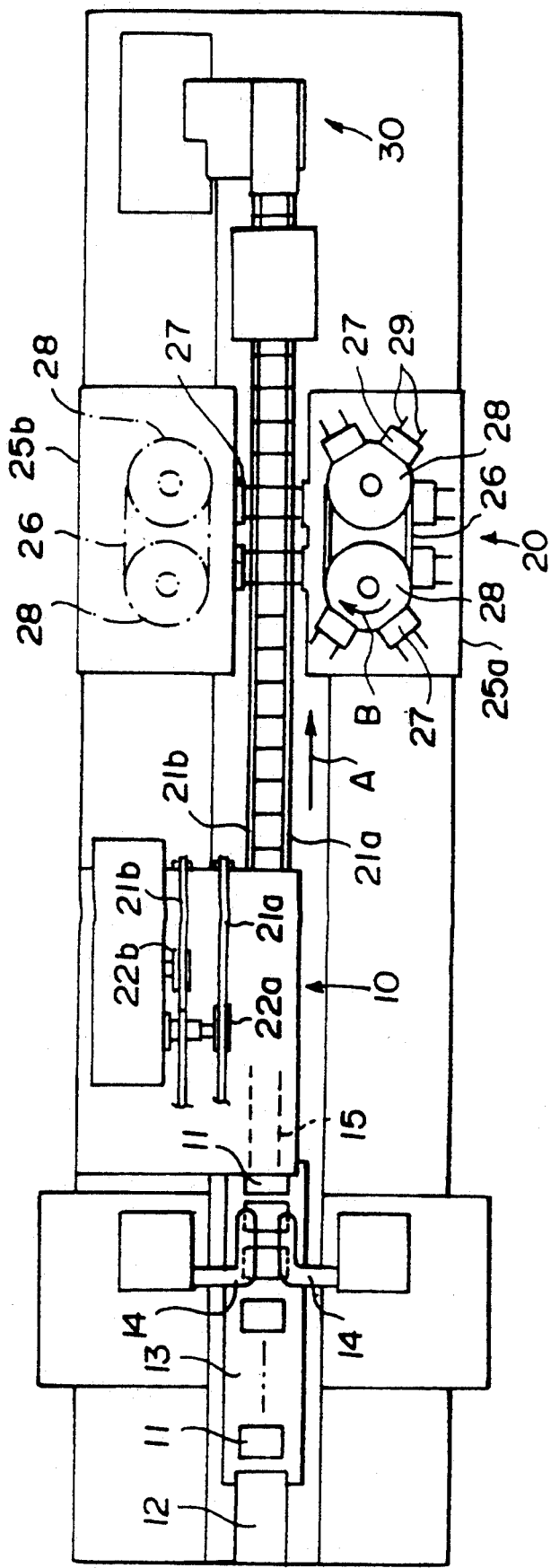
Figure 3:
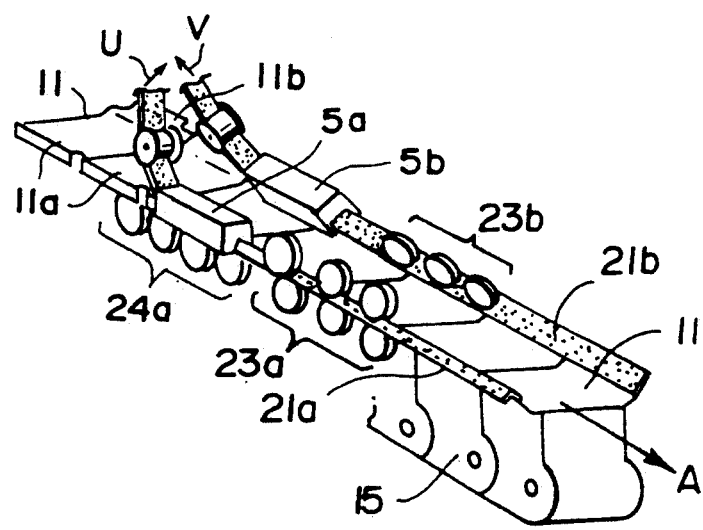
FIG. 3 is a perspective view showing the contact bonding section in detail.
Figure 4:
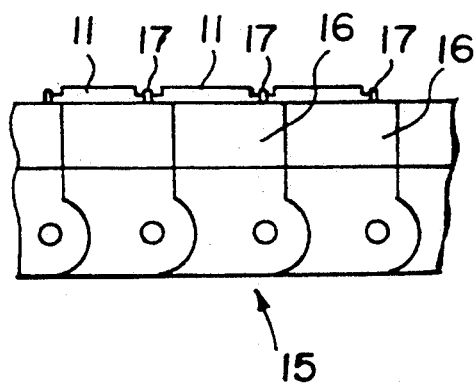
FIG. 4 is a side view showing the metal blank conveying mechanism employed in the system shown in FIG. 2.

In FIG. 2, metal blanks 11 each of which is to be tubed into a shell plate of a film cartridge are cut into a predetermined shape after a printing step and a coating step and then formed into a ship-like shape in cross-section as shown in FIG. 3. Then the metal blanks 11 are placed on a conveyor 13 one by one at a metal blank feeding section 12. Each metal blank 11 is placed on the conveyor 13 with the side which forms the inner surface of the shell plate directed upward. The metal blank 11 is conveyed under a pair of high-frequency heating systems 14 and the left and right (upper and lower as seen in FIG. 2) edge portions 11a and 11b of the metal blank 11 are heated by the heating systems 14.

Thereafter the metal blank 11 is placed on a bucket 16 of a bucket conveyor 15 which is driven continuously. The bucket conveyor 15 conveys the metal blank 11 in the direction of arrow A through a contact bonding section 10, a teremp cutting section 20 to a stacking section 30. As clearly shown in FIG. 4, each bucket 16 of the bucket conveyor 15 has a pair of locator projections 17 at opposite edge portions of a metal blank support face on which the metal blank 11 rests. The metal blank 11 is positioned by the locator projections 17 and the metal blanks 11 on the respective buckets 16 are conveyed with the opposed ends of the metal blanks 11 on adjacent buckets 16 closely spaced from each other.

In the contact bonding section 10, a pair of teremps 21a and 21b in continuous lengths which have been applied with adhesive on the rear side are stretched over the bucket conveyor 15 passes around rollers 22a and 22b and suitable means such as tension rollers not shown. The teremps 21a and 21b are of a knitted structure and are bonded to the left and right edge portions of the metal blanks 11 by contact bonding with their leading ends directed in the direction of the arrow A. That is, the rear sides of the teremps 21a and 21b are opposed to the left and right edge portions 11a and 11b of the metal blank 11 and the teremps 21a and 21b are pressed against the left and right edge portions 11a and 11b of the metal blank 11 by roller pairs 23a and 23b as shown in FIG. 3.

Figure 5:
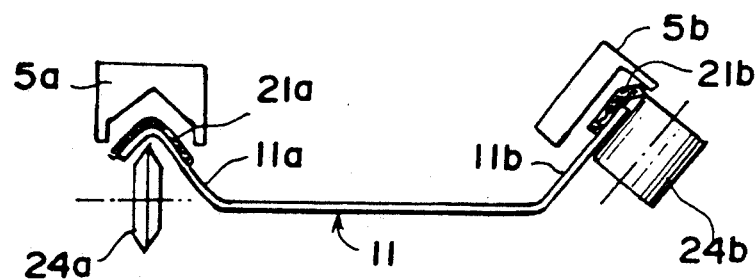
FIG. 5 is a front view showing the locator members employed in the system shown in FIG. 2.
Figure 6:
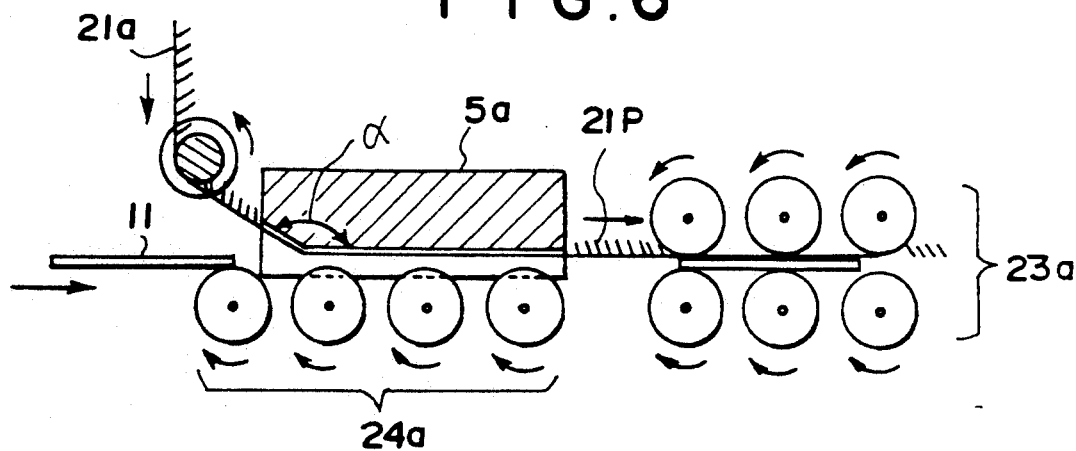
FIG. 6 is a side cross-sectional showing the locator members.

Before the contact bonding, the teremps 21a and 21b are positioned relative to the left and right edge portions 11a and 11b of the metal blank 11 by being passed through guide groove portions of a pair of locator members 5a and 5b which are respectively opposed to rollers 24a and 24b with the teremps 21a and 21b intervening therebetween as shown in FIGS. 5 and 6.

As will be described in detail later, before they are brought into contact with the locator members 5a and 5b, the teremps 21a and 21b in continuous lengths are subjected to a process in which the pile is substantially uniformly inclined at an angle rearward with respect to the direction in which the teremp is conveyed.

The teremps 21a and 21b bonded to the metal blank 11 are moved together with the metal blank 11 as the metal blank 11 is conveyed. Accordingly, the metal blanks 11 are conveyed to the teremp cutting section 20 connected to each other by the teremps 21a and 21b. The teremp cutting section 20 comprises left and right teremp cutting mechanisms 25a and 25b. Since they are the same in structure, only the left teremp cutting mechanism 25a will be described here.

In this particular embodiment, the teremp cutting mechanism 25a has eight cutter units 27 connected to an endless chain 26 at regular intervals. The chain 26 is passed around a pair of sprockets 28 and is arranged to run in parallel to the bucket conveyor 15 on one side of the metal blank 11 to which the teremps 21a and 21b have been bonded. The sprockets 28 are connected to the driving mechanism (not shown) of the bucket conveyor 15 and drives the chain 26 in the direction of arrow B at the same speed as the bucket conveyor 15. Accordingly, each cutter unit 27 moves on the side of the metal blank 11 in the same direction at the same speed as the metal blank 11. Each cutter unit 27 has a pair of cutters 29 and the cutters 29 cut the teremp 21 between adjacent metal blanks 11 while the cutter unit 27 is moved in synchronization with the metal blank 11.

As the cutter unit 27, one disclosed in detail in U.S. Pat. Nos. 4,862,579 and 4,891,089 can be used.

The separated metal blanks 11 each applied with teremp strips are conveyed to the stacking section 30 and are stacked there. The metal blanks 11 stacked are fed to a tubing section (not shown) for tubing each metal blank 11 into a cylindrical shell plate 11p (FIG. 7).

Figure 7:
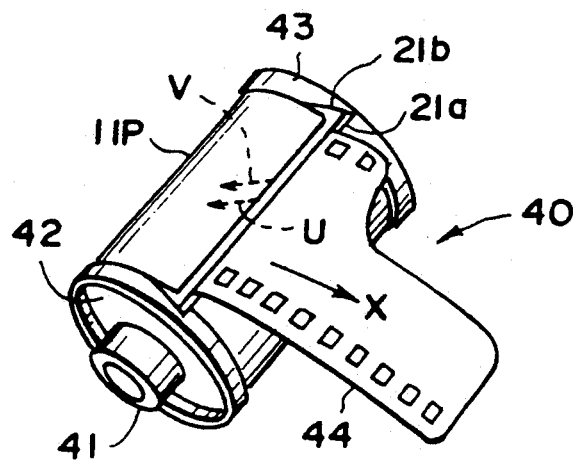
FIG. 7 is a perspective view of a film cartridge which is assembled by use of the method of the invention.

As shown in FIG. 7, a spool 41 with a roll of film 44 is inserted into the shell plate 11p, and caps 42 and 43 are mounted on ends of the shell plate 11p, whereby a film cartridge 40 is obtained. Such assembly of the film cartridge 40 may be performed, for instance, by the method disclosed in Japanese Unexamined Patent Publication No. 59(1984)-143841.

Now the process for inclining the pile of the teremp will be described in conjunction with the teremp 21a with reference to FIG. 1.

Figure 1:
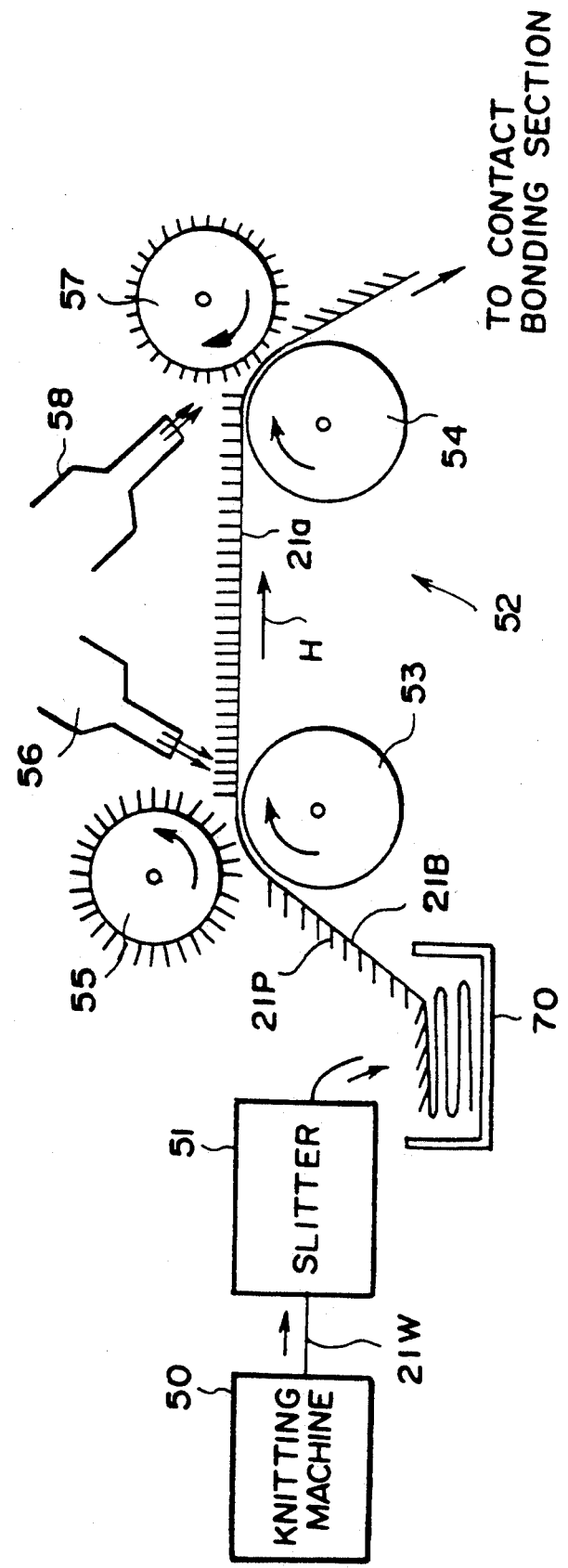
FIGS. 1 and 2 show a system for carrying out a method of bonding the teremp to the shell plate in accordance with a first embodiment of the present invention, FIG. 1 showing the section which feeds the teremps to the contact bonding section of the system.

In FIG. 1, a wide teremp sheet 21W in continuous length which is knitted by a knitting machine 50 is slit into a plurality of long teremp strips by a slitter 51. The teremp 21a is one of the long teremp strips thus obtained. The teremp 21a is initially stored in a container 70 and then transferred.

Figure 8:
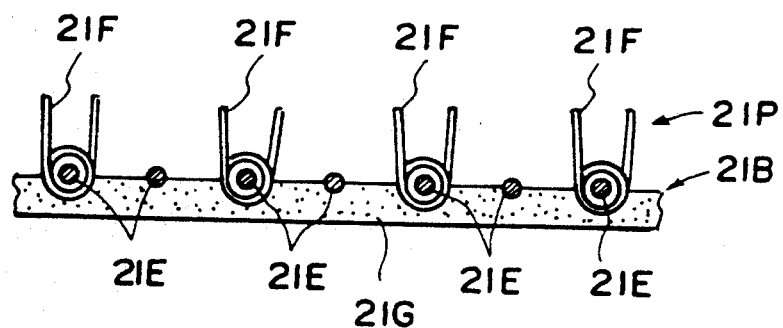
FIG. 8 is a schematic cross-sectional view of the teremp of a knitted structure.

FIG. 8 is a cross-sectional view of the teremp 21a. In FIG. 8, reference numeral 21E denotes chain yarn which forms the base fabric, and reference numeral 21F denotes pile yarn knitted into the chain yarn 21E. A sealant adhesive resin layer 21G is formed on the side of the base fabric opposite to the piled side.

Figure 9:
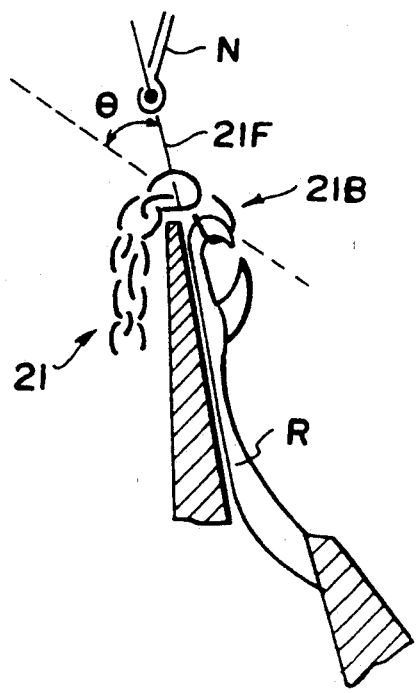
FIG. 9 is a schematic view for illustrating the control of orientation of the pile when knitting the teremp shown in FIG. 8.

The teremp 21a is transferred from the container 70 to a dryer 52. When the teremp 21a is transferred to the dryer 52, the pile 21p has been inclined rearward with respect to the conveying direction. The inclination of the pile 21p is provided when the wide teremp sheet 21W is knitted. That is, as shown in FIG. 9, when the pile yarn 21F is knitted into the chain yarn 21E by a knitting needle R in the knitting machine 50, an angle $\theta$ is set between the base fabric 21B and the pile yarn 21F.

The angle $\theta$ is determined according to the swing angle of a beard needle N and can be a value not smaller than 0° and smaller than 90°. In the knitted teremp 21W, the pile 21p projects from the base fabric 21B at the angle $\theta$ and the angle $\theta$ does not change so long as the swing angle of the bear needle N is fixed. Thus the orientation of the pile 21p is substantially regular from the beginning of the knitting to the end of the same.

Though the teremp 21a thus obtained may be delivered to the contact bonding section as is, in this particular embodiment, it is further subjected to the following process in the dryer 52 shown in FIG. 1 in order to further regulate the orientation of the pile 21p. That is, in the dryer 52, the teremp 21a in a continuous length is passed around conveyor rollers 53 and 54 and conveyed toward the contact bonding section 10 in the direction of arrow H. A brush roller 55 which is rotated in the same direction as the teremp conveying direction brushes forward the pile 21p of the teremp 21a and at the same time, hot air from a heater 56 heats the pile 21p, whereby the orientation of the pile 21p is regulated in the direction perpendicular to the surface of the base fabric 21B.

Thereafter a brush roller 57 which is disposed close to the conveyor roller 54 and is rotated in the direction reverse to the teremp conveying direction brushes rearward the pile 21p of the teremp 21a and at the same time, hot air from a heater 58 heats the pile 21p, whereby the pile 21p is regularly oriented rearward at the angle $\theta$ to the surface of the base fabric 21B. The clearance d between the surface of the base fabric and the brush roller 57 should be about L·sin $\theta$ wherein L represents the length of the pile.

As described above, when the teremp 21a in a continuous length runs along the locator member 5a, drag acts on the piled side of the teremp 21a. However, in this embodiment, the pile 21p is substantially uniformly oriented rearward at the angle $\theta$, the drag is very small and fluctuates less. Thus the teremp 21a can be precisely positioned relative to the metal blank 11.

In the film cartridge manufactured by bonding the teremps in the manner described above, poor light-shielding performance and/or damage on the film due to wrong positioning of the teremps can be avoided.

In order to prove the effect described above, four groups of teremps were prepared and were checked for the drag, the rate of products rejected due to wrong positioning of the teremps and the light-shielding performance, the first to third groups of teremps being in accordance with the present invention and the fourth group of teremps being a control as shown in the following table.

|   | teremp 1 (invention) | teremp 2 (invention) | teremp 3 (invention) | control |
|---|---|---|---|---|
| d | 0.71 mm | 0.87 mm | 1.0 mm | not controlled |
| $\theta$ | 45° | 60° | 85° | not controlled |

All the teremps were knitted by a raschel machine using 50d/24f polyester yarn as the pile yarn and 75d/24f polyester yarn as the chain yarn. The pile length was 1.0 mm and the pile density was 30,000/cm² in each teremp.

Drag

Those which are the same as the locator members 5a and 5b in structure were used, and each teremp was pulled at 300 mm/min with the piled side of the teremp in contact with the inner side of the locator members, and the drag at that time was measured.

Rate of Products Rejected Due to Wrong Positioning of the Teremps

Teremps were bonded to metal blanks 11, 100 for each group of the teremps and the rate of metal branks 11 to which the teremps were bonded in a wrong position were investigated.

Further the drag and the rate of rejected products were measured in the case where the teremps which were the same as those of the first to third groups were conveyed in the reverse direction so that the piles were oriented forward with respect to the teremp conveying direction. The result on this case is shown at the column of controls 1 to 3 and the result on the control shown in the above table is shown at the column of control 4 in the following table.

Light-Shielding Performance

Film cartridges for 35 mm roll film were assembled using the metal blanks 11 provided with the teremps of the first to third groups and the film cartridges were exposed to the light at 100,000 Lux from below, above, left and right for 2 minutes each. Then the films were developed and fogging was checked. The results were as shown in the following tables.

|  | invention | | | control | | | |
|---|---|---|---|---|---|---|---|
|  | 1 | 2 | 3 | 1 | 2 | 3 | 4 |
| pull out force (g) | 180 | 220 | 210 | 800 | 630 | 600 | 850 |
| % of rejects | 0.1 | 0.3 | 0.2 | 50 | 12 | 5 | 55 |

|  | invention 1 | invention 2 | invention 3 |
|---|---|---|---|
| light-shielding | X | O | O |

X represents fogging was observed in the image frame
O represents fogging was not observed in the image frame As can be understood from the tables above, both the drag and the rate of rejected products were greatly smaller in the teremps 1 to 3 in accordance the present invention than the controls 1 to 4. The reason why the light-shielding performance is worse in the teremp 1 than in the teremps 2 and 3 may be considered that the thickness of the teremp 1 is smaller than those of the teremps 2 and 3 due to the small value of angle $\theta$. Thus, the angle $\theta$ is preferably not smaller than 60° and smaller than 90°.

It is further preferred that the piles of the teremps 21a and 21b be rearwardly and inwardly oriented as shown by arrows U and V in FIG. 3. With this arrangement, the piles of the teremps 21a and 21b are oriented in the directions of arrows U and V in the assembled film cartridge 40 shown in FIG. 7. Such orientation of the pile includes a component directed in a direction opposite to the direction in which the film is drawn out through the film slit. When the piles of the teremps have such a controlled orientation, the film can be drawn out with a smaller force than in a conventional film cartridge having teremps whose piles have irregular orientation.

Now a method of bonding the teremps to the shell plate in accordance with another embodiment of the present invention will be described with reference to FIGS. 10 and 11.

Figure 10:
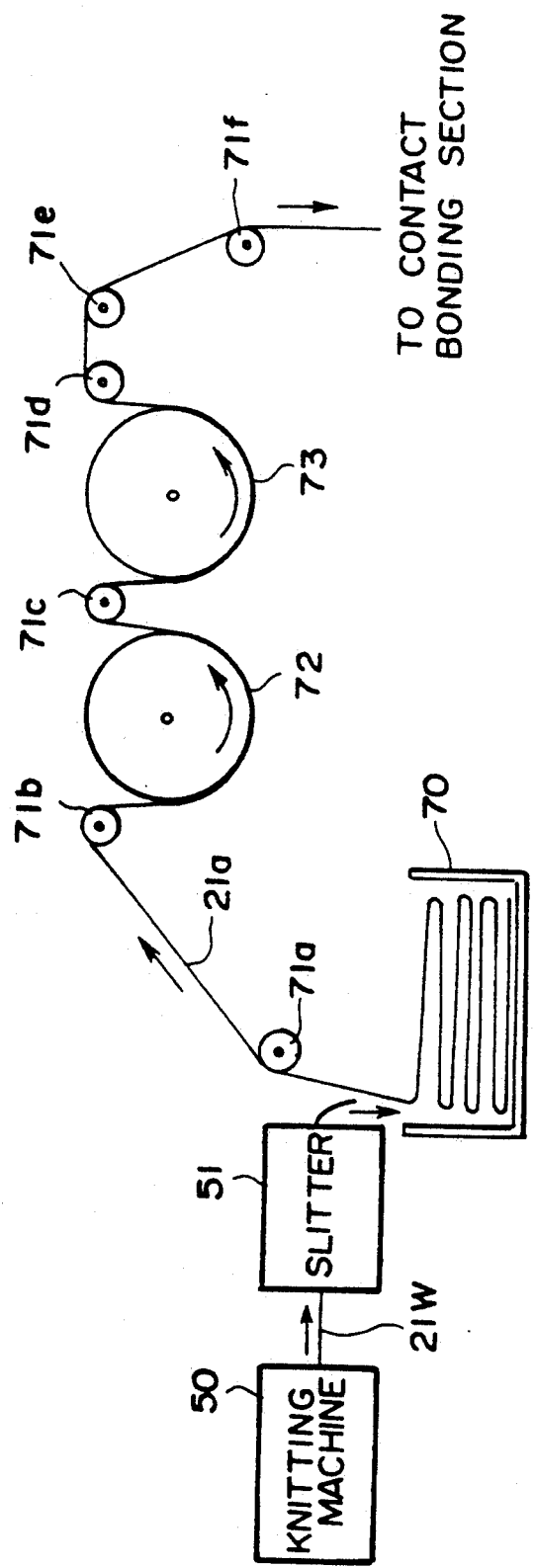
FIG. 10 is a schematic view showing the section which feeds the teremps to the contact bonding section of a system for carrying out a method of bonding the teremp to the shell plate in accordance with a second embodiment of the present invention.
Figure 11:
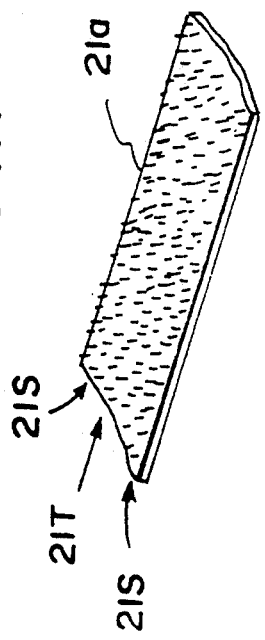
FIG. 11 is a fragmentary perspective view of a teremp in a continuous length.

In FIGS. 10 and 11, the elements analogous to those described above are given the same reference numeral and will not be described here.

In FIG. 10, the teremps 21a in a continuous length in the container 70 is passed around rollers 71a to 71f and then conveyed toward the contact bonding section 10. A heating drum 72 is disposed between the rollers 71b and 71c and a cooling drum 73 is disposed downstream of the heating drum 72 between the rollers 71c and 71d. The teremp 21a is passed also around the heating drum 72 and the cooling drum 73. In this embodiment, an ultrasonic slitter is used as the slitter 51.

The heating drum 72 heats the teremp 21a at a temperature not lower than the softening point and lower than the melting point of the materials forming the teremp 21a, and then the cooling drum 73 cools the teremp 21a to a temperature lower than the softening point.

When the teremp 21a formed of thermoplastic materials is slit by the ultrasonic slitter, the longitudinal edges 21S (FIG. 11) of the teremp 21a along which the wide teremp sheet 21W is cut are stretched under heat generated by the ultrasonic slitter and thereafter solidify while the middle portion 21T of the teremp 21a is not subjected to heat, which results in twisting in the teremp 21a and in positioning the teremp 21a in a wrong position relative to the metal blank 11 as described above. Further twisting in the teremp can cause the teremp to slip off a conveyor roller.

By first heating the whole teremp 21a to a temperature not lower than the softening point and lower than the melting point of the materials forming the teremp 21a and cooling it to a temperature lower than the softening point under tension applied to the teremp 21a by the rollers, the twisting in the teremp 21a produced during slitting step can be eliminated. Since the state of the teremp thus treated is stable until the teremp is heated above the softening point, the teremp 21a may be directly fed to the contact bonding section 10 from the system shown in FIG. 10, or may be first taken up and then fed to the contact bonding section 10.

In order to prove the effect described above, teremps of a first group were fed to the contact bonding section 10 in FIG. 2 by the system shown in FIG. 10 and teremps of a second group were fed to the contact bonding section 10 without subjecting them to the heating drum 72 and the cooling drum 73. Then the twisting in the teremps and the rate of rejected products were investigated.

The teremps of the both groups were substantially the same as the teremps 1 to 3 in the first embodiment in the pile yarn, chain yarn, knitting machine by which it was knitted, pile length and pile density except that the angle θ of orientation of the pile was 90°. An acrylic resin was used as the sealant adhesive 21G. The heating drum 72 and the cooling drum 73 were both 800 mm in diameter. The teremps were passed through the drums 72 and 73 at 7 m/min under a tension of 500 g. The heating drum 72 heated the teremps at 70° C. (the softening points of polyester and acrylic resin are 70° C., and their melting points are 100° C. and 90° C.), and the cooling drum 73 cooled them at 10° C. The result is shown in the following table. In the following table, the twist in the teremps are expressed in terms of the rate of stretch of each teremp at the middle portions 21T to the length of the teremp measured along the longitudinal edge 21S. The rate of rejected products were investigated in the same manner as in the first embodiment.

|  | 1st group (invention) | 2nd group (control) |
| --- | --- | --- |
| twist | 0 to 5% | 6 to 10% |
| % of rejects | 0.2% | 50% |

As can be understood from the table above, by heating and cooling the teremps in the manner described above, twist in the teremps can be remarkably removed and the accuracy in positioning the teremps relative to the metal blank 11 can be greatly improved.

Preferably the chain yarn which forms the base fabric of the teremp of the knitted structure has a wale density of 15 to 38 wales/inch. The wale density is defined as the number of wales an inch. More strictly, in this specification, "the wale density of the chain yarn" is defined as follows. A wide teremp sheet is knitted and is slit into teremps in continuous lengths after being subjected to the requisite finishing for a desired application including dyeing, antistatic treatment, brushing, application of sealant and/or adhesive and the like. Thereafter each teremp in a continuous length is left to stand for 24 hours in a room at 20° C., 60% RH and then the number of wales of the chain yarn which exists in the teremp per inch is determined.

The wale density depends upon gauge of the knitting machine (the number of needles per inch of the knitting machine) and the shrinkage of the base fabric.

Since the pile yarn is entwined about the chain yarn of the base fabric, the pile density which governs the light-shielding performance is closely related to the wale density of the chain yarn.

When the wale density is low, the pile density is low and the light-shielding performance deteriorates.

Further when the wale density of the chain yarn exceeds 38 wales/inch, the chain yarn becomes apt to break, which results in falling off of the pile yarn.

The base fabric and the pile can be formed of one or more of synthetic fiber yarns, natural fiber yarns and regenerated fiber yarns, e.g., polyamide yarns such as nylon yarn; polyester yarns such as polyethylene terephthalate; polyolefin yarns such as vinylon yarn, polyvinyl chloride yarn, polyacrylonitrile yarn, polyvinylidene chloride yarn, polyethylene yarn, and polypropylene yarn; polyvinyl alcohol yarn; viscose rayon; cuprammonium rayon; acetate yarn; cotton yarn; silk yarn; woolen yarn.

The yarns for forming the base fabric and the pile may be either the same or different from each other.

The yarns may be either in the form of regular yarn or in the form of specialty yarn such as conjugated yarn, high bulky yarn, fancy yarn or the like.

In view of prevention of static marks and/or scratches on the roll film in the film cartridge and in order to reduce the drag upon drawing out of the film cartridge and to ensure an excellent light-shielding performance, it is preferred that the pile yarn be polyamide yarn or polyester yarn which is black in color and contains antistatic agent and/or conductive material. In view of antistatic performance, it is preferred that the base fabric be of rayon yarn.

It is especially preferred in view of improvement in the light-shielding performance that the pile be formed of a combination of the regular yarn and a specialty yarn so that the pile stands with the regular yarn and the specialty yarn entwined about each other. It is preferred in view of improvement in the light-shielding performance and reduction of the drag that the yarns forming the base fabric and the pile be 30 to 150 deniers in thickness and be formed of 10 to 1000 filaments. In view of improvement in the light-shielding performance, it is more preferred that the pile yarn be 70 to 120 deniers in thickness and be formed of 20 to 80 filaments.

In order to provide the yarns with light-shielding function, the yarns may be dyed by various methods suitable for the specific yarns employed.

Now, dyes and dyeing methods suitable for nylon yarn, polyester yarn and rayon yarn will be described below, though they need not be limited to those described below.

Acid dyes, metal complex dyes, chrome dyes, disperse dyes, reactive dyes, vat dyes and the like are used for dyeing nylon yarn.

Methods of dyeing nylon yarn are described in "Shin Senshokukakou Kouza (New Dyeing Course)" vol. 8 "Dip Dyeing III", pp. 1 to 18 (1973), Kyouritsu Shuppan K.K.

As the dyeing machine for nylon yarn, a hank dyeing machine, a cheese dyeing machine, a muff dyeing machine, or the like can be used as described in "Shin Senshokukakou Kouza (New Dyeing Course)" Vol. 8 "Dip Dyeing III", pp. 22 to 28 (1973), Kyouritsu Shuppan K.K.

Disperse dyes, azoic dyes, vat dyes and the like are used for dyeing polyester yarn. In the case of modified polyester yarn, basic dyes are sometimes used.

As described in "Shin Senshokukakou Kouza (New Dyeing Course)" Vol. 8 "Dip Dyeing III", pp. 57 to 73 (1973), Kyouritsu Shuppan K.K., polyester yarn can be dyed various methods such as carrier dyeing, high temperature high pressure dyeing, thermosol dyeing, pad steam dyeing and the like.

As the dyeing machine for polyester yarn, a hank dyeing machine, a cheese dyeing machine or the like can be used as described in "Shin Senshokukakou Kouza (New Dyeing Course)" Vol. 8 "Dip Dyeing III", pp. 75 to 78 (1973), Kyouritsu Shuppan K.K.

Direct dyes, reactive dyes, sulphur dyes, vat dyes, naphthol dyes and the like are used for dyeing rayon yarn. Methods of dyeing rayon yarn are described in "Shin Senshokukakou Kouza (New Dyeing Course)" Vol. 6 "Dip Dyeing I", pp. 145 to 152 (1973), Kyouritsu Shuppan K.K. As the dyeing machine for rayon yarn, a hank dyeing machine, a cake dyeing machine or the like can be used as described in "Shin Senshokukakou Kouza (New Dyeing Course)" Vol. 6 "Dip Dyeing I", pp. 152 to 153 (1973), Kyouritsu Shuppan K.K.

It is preferred that the teremp be subjected to antistatic treatment in order to prevent production of static marks on the roll of film.

As the antistatic agent for this purpose, those disclosed, for instance, in Japanese Unexamined Patent Publications No. 62(1987)-28604 can be typically used. For nylon yarn, a method in which the nylon yarn is treated with "Deatoron N (Nikka kagaku kougyousha)" for 20 minutes at 80° C. in the dyeing machine is especially preferable. Further for polyester yarn, a method in which the polyester yarn is treated with "Permalose TM (ICI Co.)" for 20 minutes at 130° C. in a high temperature high pressure dyeing machine is especially preferable.

The total thickness of the teremp (thickness of the base fabric plus thickness of the pile) is preferably 1 to 2 mm and the pile density is preferably 20000 to 45000/cm².

As described, the teremp is slit from a wide sheet. The wide sheet may be slit by any method. For example, it may be slit by the use of a rotary cutter, an ultrasonic cutter, a laser cutter, a heat cutter or a heat blade as disclosed in Japanese Utility Model Publication No. 48(1973)-35790. As long as the wale density of the chain yarn is 15 to 38 wales/inch, the possibility of cutting the chain yarn is very small and accordingly falling off of the pile from the slit edge can be greatly suppressed.

In addition to the film cartridge, the teremp can be used as a light-shielding material for containers for various photosensitive materials (photographic film, photographic paper, photosensitive resin films, PS plate, computer graphic film, heat-sensitive paper, micro film, X-ray film and etc.) and as a light-shielding liner for instruments which handle photosensitive material.

EXAMPLE 1

A plurality of film cartridges (JIS 135) were prepared using different types of teremps (examples 1 to 4 and controls 1 to 3). The teremps were made in the following manner.

Each teremp was slit from a wide sheet which was 1 meter in width and was knitted with the pile yarn, the chain yarn and the insertion yarn shown in table 1 by the knitting machine shown in table 1. The wide sheet in the green state thus obtained was subjected to dyeing, antistatic treatment and brushing, and vinyl acetate resin emulsion was applied to the base fabric as the sealant layer. After the vinyl acetate resin emulsion was dried, ethylene-vinyl acetate hot-melt resin was applied as the adhesive layer on the sealant layer. The wide sheets thus finished had the following wale density.

example 1—18 wales/inch
example 2—24 wales/inch
example 3—30 wales/inch
example 4—36 wales/inch In the case of example 3, since the chain yarn was shrinkable polyester yarn, the wale density in the green state (before finishing) was the same as that of example 2 (22 wales/inch) but increased to 30 wales/inch in the finished state.

control 1—13 wales/inch
control 2—40 wales/inch
control 3—60 wales/inch

In the case of control 2, the chain yarn was shrinkable polyester yarn which was the same as that used in example 3. Example 3 was a tricot knitted web whose pile was formed by raising.

Each of the wide sheets in the finished state was slit into 11.5 mm wide teremps by an ultrasonic cutter whose cutting edge was 2 mm in thickness and whose nose angle was 120°. Then the teremp was bonded to a metal blank of the shell plate of the film cartridge as shown in FIG. 7. Thus the film cartridges of examples 1 to 4 and controls 1 to 3 were prepared. The inner space of the film exit slit of each film cartridge was 2.0 mm.

The film cartridges were checked for the total thickness of the teremp, the light-shielding performance and the number of pile loops which fell off the teremp under the following conditions. The result was shown in table 1.

Total Thickness of the Teremp

Thickness of the base fabric plus thickness of the pile in mm as measured by a thickness gauge under load of 90 g/cm².

Light-Shielding Performance

The film cartridges were loaded with a roll film of ASA 400 and the film cartridges were exposed to light at 100,000 Lux for 3 minutes. Then the film were developed with CN-16 developing solution (Fuji Photo Film K.K), fixed, washed and dried. Then fogging was checked. The number of the fogged laps of the film was visually inspected. In table 1, ⊙ stands for "very excellent",
○ stands for "excellent",
● stands for "acceptable"
▲ stands for "to be improved", and
X stands for "unacceptable".

Number of Pile Loops Which Fell Off

The 11.5 mm wide teremps in a length of 30 cm was rolled up and adhesive cellophane tape was applied to a side surface of the teremp roll. Then the tape was peeled off and the number of pile loops adhered to the tape was counted. The number converted to the number per cm² was shown in table 1.

In table 1, light-shielding performance is abbreviated as L/S and number of pile loops which fell off is abbreviated as P/F.

the pile is reduced and the light-shielding performance of the teremp deteriorates.

By dyeing all the yarns forming the teremp by yarn-

TABLE 1

|  | example 1 | example 2 | example 3 | example 4 | control 1 | control 2 | control 3 |
|---|---|---|---|---|---|---|---|
| pile yarn | 50D/36F polyester | 50D/36F polyester | 50D/36F polyester | 50D/36F polyester | 50D/36F polyester | 50D/36F polyester | 50D/24F polyester |
| chain yarn | 75D/24F polyester | 75D/24F polyester | 75D/24F polyester shrinkable | 75D/24F polyester | 75D/24F polyester | 75D/24F polyester shrinkable | 75D/24F polyester |
| knitting machine | double raschel | double raschel | double raschel | double raschel | double raschel | double raschel | tricot |
| gauge | 16 | 22 | 22 | 32 | 12 | 32 | 28 |
| wale dens. (green state) | 16 | 22 | 22 | 32 | 12 | 32 | 28 |
| course dens. (green state) | 60 | 60 | 60 | 60 | 60 | 60 | 90 |
| wale dens. | 18 | 24 | 30 | 36 | 13 | 40 | 60 |
| course dens. | 65 | 65 | 80 | 65 | 65 | 65 | 62 |
| pile dens. | about 26000 | about 23000 | about 27000 | about 34000 | about 24000 | about 36000 | about 27000 |
| piles/stump | 4/cm² | 2/cm² | 2/cm² | 2/cm² | 2/cm² | 2/cm² | 2/cm² |
| thickness | 1.6 mm | 1.6 mm | 1.6 mm | 1.6 mm | 1.6 mm | 1.6 mm | 1.6 mm |
| L/S | ● | ○ | ○ | ⊙ | X | ⊙ | ○ |
| fogged lap | 2.0 | 1.0 | 0.5 | 0 | 3.0 | 0 | 1.0 |
| P/F | 5 | 17 | 20 | 83 | 3 | 186 | 352 |

D stands for denier, F stands for filament

As can be understood from table 1, in any of the film cartridges of examples 1 to 4, the number of piles which fell off was smaller than 100/cm², and the number of the fogged laps of the film was smaller than 1.5. This proves excellent light-shielding performance of the film cartridges of examples 1 to 4.

On the other hand, in the case of the controls 2 and 3, the number of plates which fell off was too large though the light-shielding performance was excellent. In the case of the control 3, the number of piles which fell off was especially large (352/cm²)

Further, in the case of the control 1 the wale density of which was only 13 wales/inch, the number of the fogged laps of the film was too large though the number of piles which fell off was small.

It is further preferred irrespective of whether the teremp is of a knitted structure or of a woven structure that the yarns forming the teremp be all dyed by "yarn-dyeing" and the yarn forming the base fabric differs from that forming the pile. In this specification, the term "yarn-dyeing" should be interpreted "to dye the yarn in the state before woven or knitted". Further, in this specification, yarns are considered to be different from each other when they differ from each other in at least one of composition, shape, thickness, number of filaments, structure, kind, dye and the like.

That is, conventionally, the teremps are generally dyed by piece dyeing, i.e., dyed in the state of fabric. However, when the teremp is dyed by piece dyeing, the pile is tilted during the dyeing step due to high temperature and the pressure imparted thereto by rollers and the like. When the pile is tilted, the effective height of dyeing, the problem can be avoided.

Further when the warp and the weft are of different materials in the case of woven teremps or when the chain yarn and the insertion yarn are of different materials in the case of knitted teremps, for instance one of regenerated fiber and the other of synthetic yarn, the teremps can be improved in anti-static properties and light-shielding performance and at the same time, falling off of the pile can be effectively prevented.

EXAMPLE 2

A plurality of film cartridges (JIS 135) were prepared using different types of teremps (examples 5 to 8 and controls 4 to 6). The teremps were made in the following manner.

Each teremp was slit from a wide sheet which was knitted or woven with the pile yarn, the chain yarn and the insertion yarn or with the warp and the weft shown in table 2 by the knitting machine or the weave machine shown in table 2. The teremp was bonded to a metal blank of the shell plate of the film cartridge as shown in FIG. 7. Thus the film cartridges of examples 5 to 8 and controls 4 to 6 were prepared. The inner space of the film exit slit of each film cartridge was 2.0 mm.

The film cartridges were checked for the total thickness of the teremp, the pile density and the light-shielding performance. The total thickness and the light-shielding performance were evaluated in the same manner as in example 1. The pile density was measured in the following manner. That is, the yarn density on the surface of the base fabric was measured by a densitometer and the result of the measurement was converted to the pile density (pile/cm²).

The results are shown in table 2.

TABLE 2

|  | example 5 (woven) | example 6 (woven) | example 7 (woven) | control 4 (woven) | control 5 (woven) | example 8 (knitted) | control 6 (knitted) |
|---|---|---|---|---|---|---|---|
| pile yarn | 90D/48F nylon | 90D/48F nylon | 90D/48F nylon | 90D/48F nylon | 90D/48F nylon | 50D/36F nylon (chain) | 50D/36F nylon (chain) |
| base fabric yarn | (weft) 120D/24F rayon (warp) 70D/32F | (weft) 120D/24F rayon (warp) 70D/32F | (weft) 120D/24F rayon (warp) 75D/15F | (weft) 108D/40F rayon (warp) 108D/40F | (weft) 120D/24F rayon (warp) 75D/15F | 120D/24F rayon (insertion) 75D/24F | 75D/24F nylon (insertion) 75D/24F |

TABLE 2-continued

|  | example 5 (woven) | example 6 (woven) | example 7 (woven) | control 4 (woven) | control 5 (woven) | example 8 (knitted) | control 6 (knitted) |
| --- | --- | --- | --- | --- | --- | --- | --- |
| machine | polyester rapier | polyester rapier | rayon rapier | rayon rapier | rayon rapier | nylon double raschel | nylon double raschel |
| dye for pile (concentration) | black acid dye (5% wf) | black acid dye (5% wf) | black acid dye (5% wf) | black acid dye (5% wf) | black acid dye (5% wf) | black acid dye (5% wf) | black acid dye (5% wf) |
| form of dyed material | yarn | yarn | yarn | woven | woven | yarn | knitted |
| dyeing machine | hank | hank | hank | wince | continuous type | hank | jet dyeing |
| thickness | 1.53 | 1.54 | 1.52 | 1.24 | 1.29 | 1.55 | 1.25 |
| pile dens. | about 32000 | about 32000 | about 31000 | about 3000 | about 31000 | about 38000 | about 38000 |
| L/S | ○ | ○ | ○ | X | | ○ | |
| fogged lap | 1.0 | 0.5 | 1.0 | 3.5 | 2.5 | 1.0 | 2.5 |

D stands for denier, F stands for filament

As can be understood from table 2, the examples 5 to 8 in accordance with the present invention exhibit excellent light-shielding performance, and provide a film cartridge in which the film can be drawn out by a relatively small force. Further in the examples 5 to 8, less pile loops fell off.

On the other hand, the controls 4 to 6 exhibit poor light-shielding performance and accordingly are unsatisfactory as the teremp for a film cartridge.

What we claim:

1. A method of bonding a pair of teremps of a knitted structure to a blank of a shell plate of a film cartridge comprising the steps of conveying a pair of teremps in continuous lengths in the longitudinal direction thereof with the piled side of each of the teremps kept in contact with a locator member, bonding the teremps in continuous lengths to opposite side edges of the blank and then cutting the teremps to conform to the blank wherein the improvement comprises the step of subjecting the teremps in continuous lengths, before they are brought into contact with the locator members, to a process in which the pile is substantially uniformly oriented rearward at an angle with respect to the direction in which the teremps are conveyed.

* * * * *